US 8,723,118 B2

(12) United States Patent
McEldowney et al.

(10) Patent No.: US 8,723,118 B2
(45) Date of Patent: May 13, 2014

(54) IMAGER FOR CONSTRUCTING COLOR AND DEPTH IMAGES

(75) Inventors: Scott McEldowney, Redmond, WA (US); Edward Giaimo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 12/572,082

(22) Filed: Oct. 1, 2009

(65) Prior Publication Data

US 2011/0079714 A1 Apr. 7, 2011

(51) Int. Cl.
*G01J 3/50* (2006.01)

(52) U.S. Cl.
USPC .......................................... 250/332; 250/226

(58) Field of Classification Search
USPC .................................................. 250/332, 226
See application file for complete search history.

(56) References Cited

U.S. PATENT DOCUMENTS

| | | | |
|---|---|---|---|
| 3,848,129 A | * | 11/1974 | Figler et al. ............... 250/339.14 |
| 4,349,277 A | * | 9/1982 | Mundy et al. ................. 356/604 |
| 4,621,284 A | * | 11/1986 | Nishioka et al. ................ 348/69 |
| 4,627,620 A | | 12/1986 | Yang |
| 4,630,910 A | | 12/1986 | Ross et al. |
| 4,645,458 A | | 2/1987 | Williams |
| 4,695,953 A | | 9/1987 | Blair et al. |
| 4,702,475 A | | 10/1987 | Elstein et al. |
| 4,711,543 A | | 12/1987 | Blair et al. |
| 4,751,642 A | | 6/1988 | Silva et al. |
| 4,796,997 A | | 1/1989 | Svetkoff et al. |
| 4,809,065 A | | 2/1989 | Harris et al. |
| 4,817,950 A | | 4/1989 | Goo |
| 4,843,568 A | | 6/1989 | Krueger et al. |
| 4,893,183 A | | 1/1990 | Nayar |
| 4,901,362 A | | 2/1990 | Terzian |
| 4,925,189 A | | 5/1990 | Braeunig |
| 5,101,444 A | | 3/1992 | Wilson et al. |
| 5,148,154 A | | 9/1992 | MacKay et al. |
| 5,184,295 A | | 2/1993 | Mann |
| 5,229,754 A | | 7/1993 | Aoki et al. |
| 5,229,756 A | | 7/1993 | Kosugi et al. |
| 5,239,463 A | | 8/1993 | Blair et al. |

(Continued)

FOREIGN PATENT DOCUMENTS

| CN | 201254344 B | 6/2010 |
|---|---|---|
| EP | 0583061 A2 | 2/1994 |

(Continued)

OTHER PUBLICATIONS

"International Search Report", Mailed Date: Apr. 27, 2011, Application No. PCT/US2010/047564, Filed Date: Sep. 1, 2010, pp. 8.

(Continued)

*Primary Examiner* — David Porta
*Assistant Examiner* — Djura Malevic
(74) *Attorney, Agent, or Firm* — Judy Yee; Micky Minhas (57) ABSTRACT

A dual-mode includes a light source configured to project a structured illumination from which visible light can be filtered. The dual-mode imager also includes a detector configured to capture both the structured illumination and visible light from the scene. A temporal or spatial filter is used to selectively block visible light from one or more portions of the detector while passing the structured illumination to the one or more portions of the detector.

20 Claims, 5 Drawing Sheets

(56) References Cited

U.S. PATENT DOCUMENTS

| | | |
|---|---|---|
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,825,928 B2 * | 11/2004 | Liu et al. ................... 356/317 |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,257,437 B2 * | 8/2007 | Demos et al. ............. 600/473 |
| 7,259,747 B2 | 8/2007 | Bell |
| 7,274,393 B2 | 9/2007 | Acharya |
| 7,289,211 B1 * | 10/2007 | Walsh et al. ............... 356/369 |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 | 5/2008 | Fujimura et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,440,637 B2 | 10/2008 | Schechner et al. |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |

(56) References Cited

U.S. PATENT DOCUMENTS

| | | | |
|---|---|---|---|
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2004/0125222 A1 | 7/2004 | Bradski et al. | |
| 2005/0058337 A1 | 3/2005 | Fujimura et al. | |
| 2005/0219552 A1 | 10/2005 | Ackerman et al. | |
| 2005/0285966 A1 | 12/2005 | Bamji et al. | |
| 2006/0221250 A1 | 10/2006 | Rossbach et al. | |
| 2007/0087564 A1* | 4/2007 | Speakman | 438/674 |
| 2007/0203413 A1* | 8/2007 | Frangioni | 600/478 |
| 2007/0249913 A1* | 10/2007 | Freeman et al. | 600/300 |
| 2008/0026838 A1 | 1/2008 | Dunstan et al. | |
| 2008/0039715 A1* | 2/2008 | Wilson et al. | 600/424 |
| 2008/0255414 A1* | 10/2008 | Voegele et al. | 600/109 |
| 2008/0255425 A1* | 10/2008 | Voegele et al. | 600/160 |
| 2008/0255459 A1* | 10/2008 | Voegele et al. | 600/476 |
| 2008/0255460 A1* | 10/2008 | Voegele et al. | 600/476 |
| 2009/0021739 A1* | 1/2009 | Tsujita et al. | 356/407 |
| 2009/0114799 A1 | 5/2009 | Maeda | |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Cho, et al. ,"Depth Image Processing Technique for Representing Human Actors in 3DTV using Single Depth Camera",Retrieved at <<http://ieeexplore.ieee.org/stamp/stamp.jsp?tp=&arnumber=4379404&isnumber=4379375>>, May 7-9, 2007, pp. 4.

Wang, et al. ,"Automatic Natural Video Matting with Depth",Retrieved at <<http://vision.ai.uiuc.edu/~qyang6/publications/pg-07-oliver-wang.pdf>>, 2007, pp. 469-472.

Eijk, R.L.J. Van,"Beyond the Flat Screen Minimal and Optimal Camera-Base Distances for Viewing 3-D Images", Retrieved at <<http://www.ijsselsteijn.nl/students/vaneijk.pdf>>, Aug. 2003, pp. 87.

"3DV Systems—Zmini—Discontinued",Retrieved at <<http://www.thinglab.co.uk/scanning_product.php?URL_=product_digiscan_3dvsystems_zmini&SubCatID_=53>>, Jul. 13 2009, pp. 2.

Sinha, S. Sudipta ,"Calibration of a Heterogeneous Network of Color and Depth Cameras",Retrieved at <<http://cs.unc.edu/~ssinha/pubs/SinhaCanestaPhase_1_2004.pdf>>, Dec. 2004, pp. 3.

"Generalized Mosaicing",Retrieved at <<http://ieeexploreieee.org/stamp/stamp.jsp?arnumber=00937494>>, Jul. 13, 2009, pp. 17-24.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

The State Intellectual Property Office of the Peopl's Republic of China, Notice of the First Office Action from Chinese Patent Application No. 20100043779.5, Apr. 3, 2013 11 pages.

\* cited by examiner

IMAGER FOR CONSTRUCTING COLOR AND DEPTH IMAGES

BACKGROUND

Cameras can be used to capture still images of a scene. Several still images taken in rapid succession can be used to generate a movie including a plurality of frames, each frame corresponding to a different still image. While such images are very useful in a variety of different applications, such images are not well suited for some purposes. In particular, conventional still images and movies do not provide adequate information to accurately assess the relative depths of the various surfaces captured in the scene.

SUMMARY

A dual-mode imager for imaging a scene illuminated by visible light is disclosed. The dual-mode imager includes a light source configured to project a structured illumination from which visible light can be filtered. The dual-mode imager also includes a detector configured to capture both the structured illumination and visible light from the scene. A temporal or spatial filter is used to selectively block visible light from one or more portions of the detector while passing the structured illumination to the one or more portions of the detector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A dual-mode imager capable of processing depth information and color information using a shared image sensor is disclosed. The digital dual-mode imager temporally and/or spatially filters light delivered to the image sensor (i.e., detector) so that a subset of pixels at a subset of times are exposed to light characterized by a first parameter (e.g., band of wavelengths), and so that a same or different subset of pixels at a same or different subset of times are exposed to light characterized by a second parameter, different than the first parameter (e.g., different band of wavelengths). In this way, light characterized by the first parameter can be used to construct a color image, and light characterized by the second parameter can be used to construct a depth image. Both images are constructed using the same image sensor—for example, by using all pixels to temporally alternate between reading color information and depth information, or by using selected pixels to read color information while other pixels read depth information.

The construction of color images and depth images using a shared image sensor is described below by way of example and with reference to certain illustrated embodiments. It will be noted that the drawings included in this disclosure are schematic. Views of the illustrated embodiments are generally not drawn to scale. Aspect ratios, feature sizes, and numbers of features may be purposely distorted to make selected features or relationships easier to appreciate.

Figure 1:
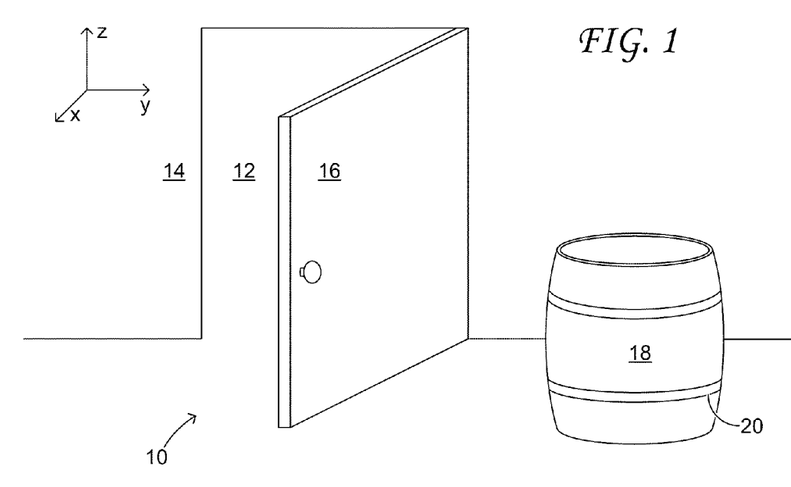
FIG. 1 shows an example scene that may be processed to construct a color image and a depth image.

FIG. 1 shows a simplified, perspective view of an example scene 10 that may be processed to construct a color image and a depth image. The scene includes various objects and surfaces arranged at different depths, i.e., distances from the point of view of an observer located in front of the scene. Surface 12 is deepest in the scene (farthest from the point of view of an observer). Surface 14 is arranged forward of surface 12 (closer to the point of view of the observer), and surfaces 16, 18, and 20 are arranged forward of surface 14. Thus, the surfaces considered presently are macro surfaces, having dimensions of the same order of magnitude as the dimensions of the scene. It will be noted, however, that the systems and methods disclosed herein are not limited to such surfaces, but will also allow the examination of much smaller areas of a structured macro surface, e.g., the interrogation of rough or irregular topologies, etc. Further, while FIG. 1 shows a static scene, the concepts described herein can be used to image dynamic scenes, such as scenes including one or more moving people or objects.

In addition to being arranged at different depths within the scene, the various surfaces shown in FIG. 1 are oriented differently with respect to each other and the observer. Surfaces 12 and 14 are oriented normal to the observer's line of sight, while surface 16 is oblique to the observer's line of sight. Moreover, curved surfaces 18 and 20 present a continuous range of orientations relative to the observer's line of sight.

The surfaces shown in FIG. 1 may also present different textures. For instance, surface 20 may be relatively smooth compared to underlying surface 18. Optically, the different textures of the scene may exhibit different light-reflecting properties. For example, surface 20 may be largely specularly reflective, while surface 18 may be largely scattering.

Finally, the various objects in the scene may be different colors. While a black and white line drawing is used to schematically depict scene 10, one skilled in the art will understand that the light absorption and light reflection properties of the various surfaces may differ from one another, and thus the color of the various surfaces may differ from one another.

In some applications, only the color information from a scene is processed to form a color image of the scene (e.g., a digital photograph or digital movie). In other applications, only the depth information from a scene is processed to form a depth image. As described herein, both the color information and the depth information are processed so that both a color image and a depth image can be formed. Instead of using two separate cameras—one to generate a color image and another to generate a depth image—the present disclosure is directed to a single dual-mode imager that generates both images.

Figure 2:
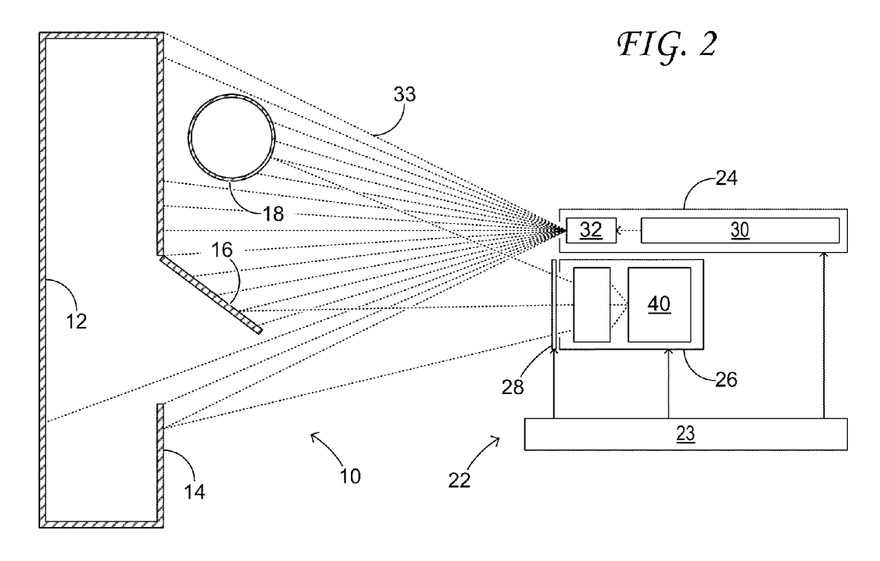
FIG. 2 schematically shows an example dual-mode imager in accordance with an embodiment of the present disclosure.

FIG. 2 shows a cross-sectional plan view of scene 10. The figure also shows dual-mode imager 22 in one example embodiment. The dual-mode imager is an optical system for imaging a scene; it comprises controller 23, light source 24, detector 26, and filter 28.

Controller 23 may be any control device configured to control light source 24, detector 26, and/or filter 28—e.g., to trigger, coordinate, and/or synchronize the functioning of these components. The controller may include a logic-subsystem and/or data-holding subsystem as described below. In some embodiments, the controller may include a depth analyzer. In other embodiments, a depth analyzer may operatively communicate with the controller, but may itself be a separate system.

The controller can coordinate the timing of the filter and the detector so that images captured by the detector while the filter is blocking visible light from the detector are sorted to construct a depth image. The controller can also coordinate the timing of the filter and the detector so that images captured by the detector while the filter is passing visible light to the detector are sorted to construct a color image. The depth analyzer may then construct a depth image based on one or more images of a structured illumination captured by the detector (i.e., one or more images captured by the detector while the filter is blocking visible light from the detector). This is described in more detail below.

Light source 24 may be any suitable light source configured to project a filterable illumination onto the various surfaces of scene 10. In particular, light source 24 is configured to project light having one or more characteristics different than corresponding characteristics of visible light, thus allowing visible light to be filtered relative to the projected light (e.g., filterable via wavelength and/or polarization state).

In the embodiment shown in FIG. 2, the light source comprises laser 30 and disperser 32. The laser may provide a beam of intense, collimated, coherent, and substantially monochromatic light of a known polarization state.

The term 'polarization state' as used herein encompasses any non-trivial indication of the direction or sense of oscillation of light or the rotation of this direction as the light propagates; the indication may be precise or approximate, complete or incomplete. One example of a complete polarization state is a full Stokes-vector representation comprising the components $S_0$, $S_1$, $S_2$ and $S_3$, which are defined as $$S_0 = |E_x|^2 + |E_y|^2$$

$$S_1 = |E_x|^2 - |E_y|^2$$

$$S_2 = |E_a|^2 - |E_b|^2$$

$$S_1 = |E_l|^2 - |E_r|^2,$$

where $E_1$ and $E_2$ are complex amplitude components of the electric field in a basis $(\hat{1},\hat{2})$, $(\hat{x},\hat{y})$ is the standard Cartesian basis, $(\hat{a},\hat{b})$ is the Cartesian basis rotated 45°, and $(\hat{l},\hat{r})$ is a circular basis defined so that $\hat{l}=(\hat{x}+i\hat{y})/\sqrt{2}$. Examples of an incomplete polarization state are the degree of polarization p, defined by $$p = \frac{\sqrt{S_1^2 + S_2^2 + S_3^2}}{S_0},$$

and the linear polarization orientation ψ, defined by $$2\psi = \arctan(S_2/S_1).$$

Continuing in FIG. 2, laser 30 may, in some embodiments, be a continuous-wave (CW) laser; in other embodiments, the laser may be pulsed, mode locked, Q-switched, etc. The power of the laser included in light source 24 may be chosen based on the scene to be imaged, with a more powerful laser being used for more distant and expansive scenes, and a less powerful laser being used for closer, more compact scenes. In addition to the power, the lasing wavelength of the laser may be chosen based on the scene to be imaged. In particular, the lasing wavelength may be chosen to overlap minimally with visible light. In one embodiment, the lasing wavelength may be a near-infrared wavelength.

Disperser 32 may be any device configured to disperse the collimated beam from laser 30 among a range of projection angles and thereby illuminate the scene with a plurality of light features spaced apart from each other. In the embodiment shown in FIG. 2, the light features form a patterned or otherwise structured illumination 33 of laser 30. FIG. 2 shows the laser beam dispersed over a range of deflection angles confined to a horizontal plane. In the illustrated embodiment, the deflection angles assume discrete values separated by a constant increment, e.g., −20°, −15°, . . . , +20°. In other embodiments, the discrete values are separated by random increments. In other embodiments, the laser beam may be dispersed horizontally over a continuous range of deflection angles. It will be understood that the numerical ranges noted herein are examples only, and other ranges fall fully within the scope of this disclosure.

Disperser 32 may further disperse the laser beam over a range of deflection angles confined to a vertical plane. Like the horizontal dispersion described above, the vertical dispersion may be discrete or continuous. If horizontal and vertical dispersions are both discrete, then the scene will be illuminated by a constellation of dots. If the vertical dispersion is discrete, but the horizontal dispersion is continuous, then the scene will be illuminated by a series of horizontal stripes. And, if the horizontal dispersion is discrete, but the vertical dispersion is continuous, then the scene will be illuminated by a series of vertical stripes, as further referenced below. These or other structured light patterns may be used without departing from the scope of this disclosure.

In order to disperse the laser beam, disperser 32 may comprise various optical components—lenses, diffractive optics, diffusers, mirrors, waveguides, masks, and the like. In some embodiments, the disperser may further comprise various active components—electromechanical actuators, choppers, piezoelectrics, and liquid-crystal light valves, for example.

Continuing with FIG. 2, detector 26 may be any device configured to capture an image of a scene by detecting light from the scene. Further, as shown in FIG. 2, the detector may be oriented so that the captured image includes at least part of the scene illuminated by light source 24 and/or visible light. In this manner, a portion of the illumination reflected from the various surfaces of the scene may be detected by the detector. Detector 26 is configured to capture both the structured illumination and visible light from the scene.

Detector 26 may include virtually any combination of optical components for collecting and/or focusing light on an image sensor 40.

Image sensor 40 may be any sensor configured to detect a relative intensity of visible light and a relative intensity of structured illumination 33. In embodiments where light source 24 comprises a near-infrared emitting laser, for example, the image sensor may include a complementary metal-oxide-semiconductor (CMOS) configured to detect light having a wavelength of approximately three-hundred eighty nanometers to approximately one thousand nanometers. Further, the image sensor may be configured to represent the captured image as an array of pixels. As such, each pixel of the captured image may encode an intensity of light reflected from a different region of the scene for one or more color channels. One skilled in the art will appreciate that various different image sensors capable of detecting visible light, light of structured illumination 33, and/or a modulated illumination may be used without departing from the scope of this disclosure. Furthermore, it is to be appreciated that image sensors can be incorporated into a variety of devices having different optical configurations.

Figures 3, 4:
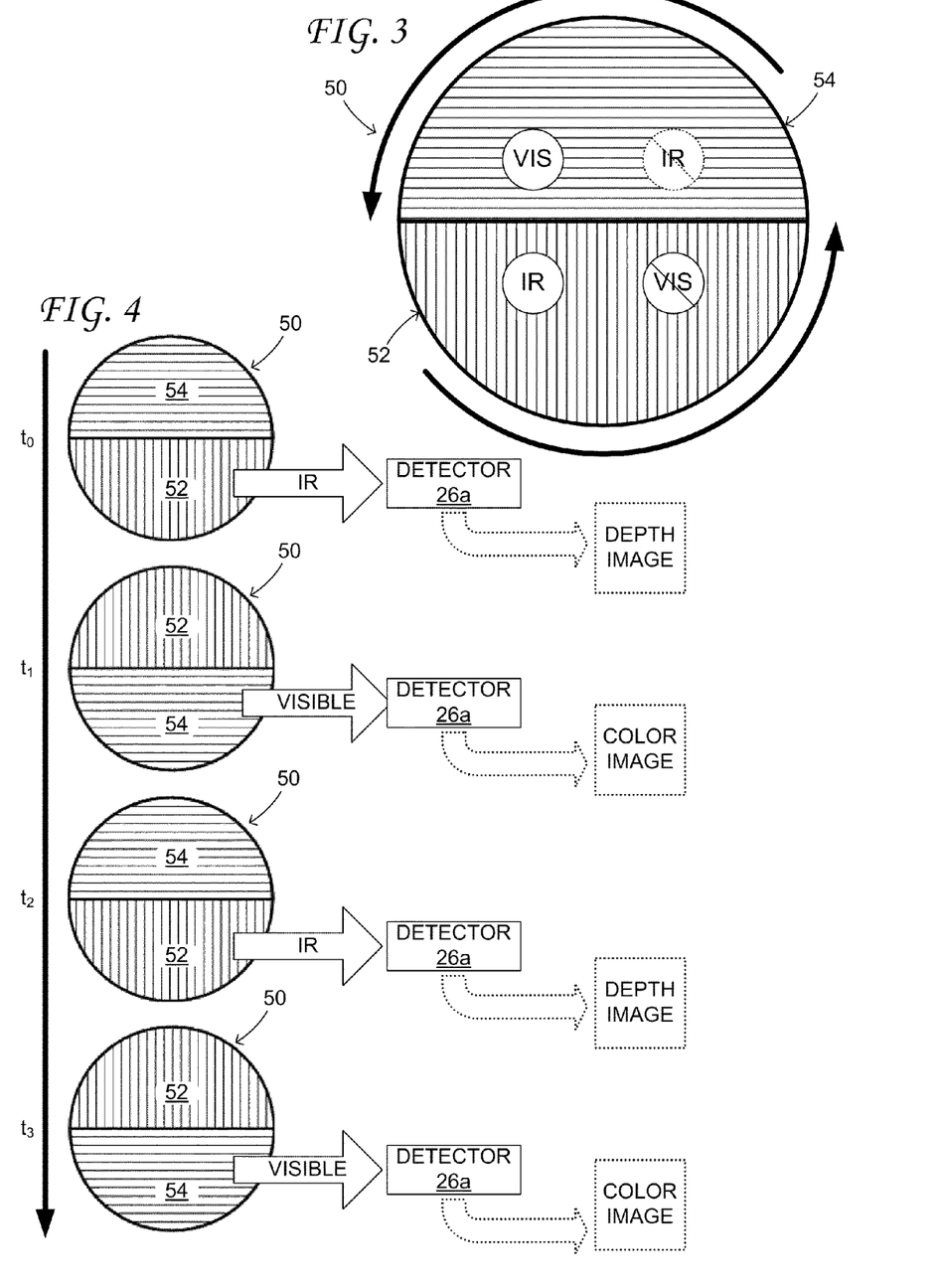
FIG. 3 schematically shows an example rotating wheel filter in accordance with an embodiment of the present disclosure.
FIG. 4 schematically shows a time sequence in which the rotating wheel filter of FIG. 3 is cooperating with a detector to construct color images and depth images.

Filter 28 may be a temporal filter or a spatial filter. A nonlimiting example of a temporal filter includes a rotating wheel filter. An example rotating wheel filter 50 is schematically shown in FIG. 3. Rotating wheel filter 50 includes a first portion 52 configured to block visible light and pass near-infrared light. The first portion is schematically identified with vertical lines. The rotating filter also includes a second portion 54 configured to pass visible light and optionally block near-infrared light. The second portion is schematically identified with horizontal lines.

FIG. 4 schematically shows rotating wheel filter 50 at four different times: $t_0$, $t_1$, $t_2$, and $t_3$, which correspond to four successive exposures of detector 26a (i.e., four successive times that the detector captures an image). Though schematic in nature, this drawing shows light traveling from left to right. Light from the scene travels through the bottom portion of the filter to the detector. As shown in this example, the first portion of the rotating wheel filter 50 is optically intermediate the scene and the detector 26a every other time the detector captures an image (e.g., times $t_0$ and $t_2$). Likewise, the second portion of the rotating wheel filter 50 is optically intermediate the scene and the detector 26a every other time the detector captures an image (e.g., times $t_1$ and $t_3$). As discussed above, a controller may set a period of the temporal filter at twice a period of the detector. In other words, the detector 26a captures two images during each rotation of the rotating wheel filter—a visible light image and a near-infrared image. That is, each rotation the rotating wheel filter 50 is configured to block visible light for approximately half of the rotation and pass visible light for approximately half of the rotation.

As schematically shown in FIG. 4, the infrared light passing to the detector can be used to generate a depth image (i.e., at times $t_0$ and $t_2$). As used herein, a depth image includes any image in which a positional depth value is recorded for each pixel (e.g., a z coordinate). Likewise, the visible light passing to the detector can be used to generate a color image (i.e., at times $t_1$ and $t_3$). As used herein, a color image includes any image in which one or more intensity values are recorded for each pixel (e.g., a single intensity value for a black and white or grayscale image or two or more intensity values corresponding to different color or luminance channels for a multi-color image).

The above described configuration is a nonlimiting example of a temporal filter. Other rotating wheel filters having a different number of visible-light-blocking and visible-light-passing portions may be used. For example, a rotating wheel filter may include two quarters that are configured to block visible light alternating with two quarters configured to pass visible light. The visible-light-blocking and visible-light-passing portions can be sized and shaped in any suitable way. Furthermore, it is to be understood that temporal filters other than rotating wheel filters may be used. In general, any filter configured to temporally alternate between blocking visible light from the detector and passing visible light to the detector may be used.

While the rotating wheel described above is provided as a nonlimiting example to illustrate the concept of filtering light for color images from light for depth images, it is to be understood that other arrangements are within the scope of this disclosure. For example, other active devices which modulate polarization (e.g., a photoelastic modulator) in combination with a wavelength sensitive polarization rotator could be used to temporally vary the signal to the image sensor.

Figure 5:
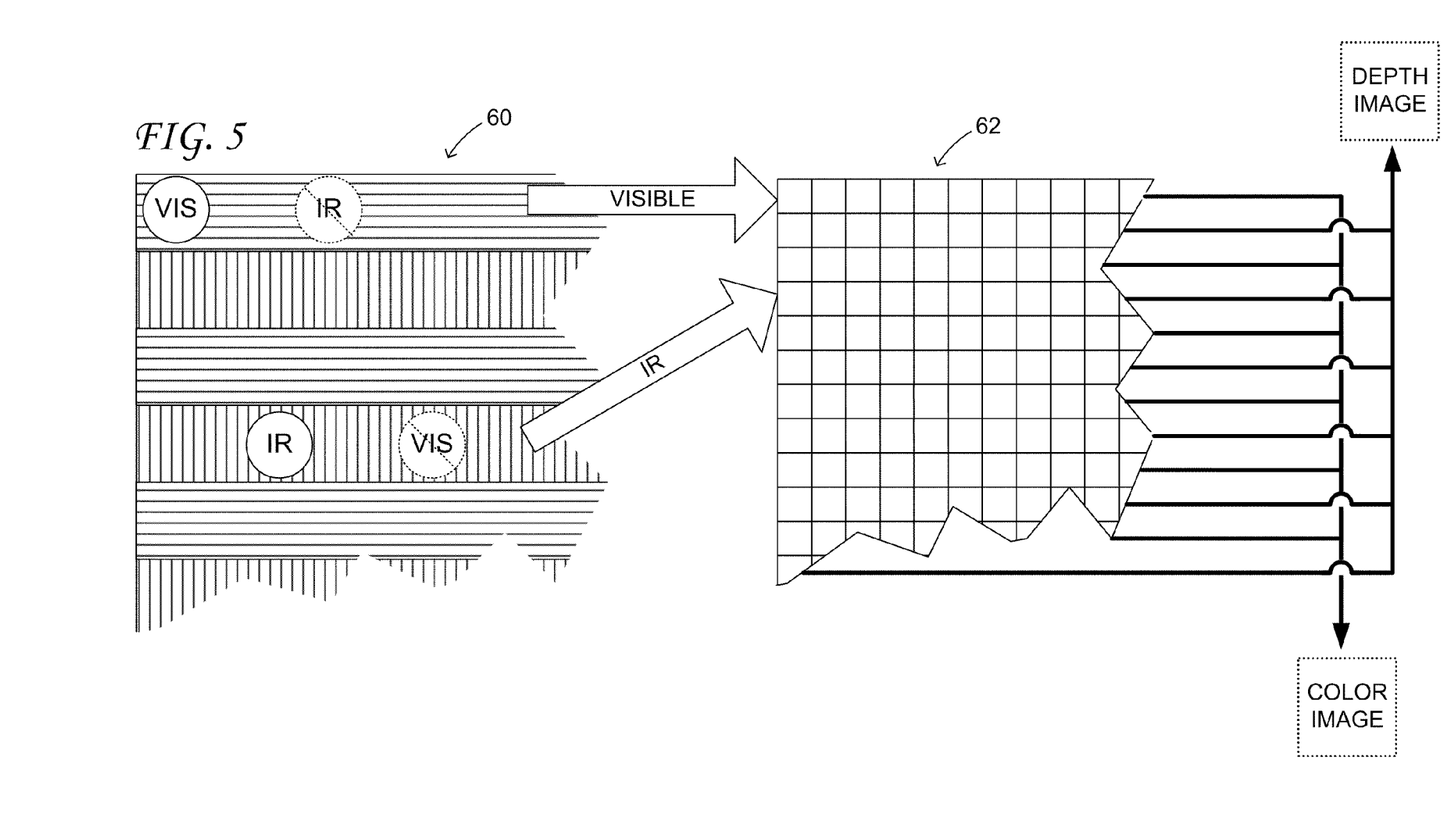
FIG. 5 schematically shows an example spatial filter cooperating with a detector to construct color images and depth images.

FIG. 5 schematically shows an example of a spatial filter 60 (partially shown). Spatial filter 60 is configured to block visible light from some portions of a detector 62 (partially shown) while allowing visible light to pass to other portions of the detector. For example, a spatial filter may be configured to block visible light from every other pixel group of a plurality of spatially alternating pixel groups of the detector (e.g., spatially alternating rows of pixels, spatially alternating columns of pixels, a checkerboard pattern of pixels, etc.). In the illustrated embodiment, spatial filter 60 and detector 62 are cooperatively configured and aligned such that even pixel rows are exposed to near-infrared light and odd pixel rows are exposed to visible light.

As schematically shown in FIG. 5, the infrared light passing to the detector can be used to generate a depth image (i.e., with the even pixel rows). Likewise, the visible light passing to the detector can be used to generate a color image (i.e., with the odd pixel rows).

Another method of separating visible and IR light is to use a color rotator. In this case, light from the scene passes through a linear polarizer and then through a filter that rotates the state of polarization for certain wavelengths but keeps the polarization state the same for other wavelengths. Light emerging has IR light in one state of polarization and visible light in a different state. Such light can be spatially separated by using a patterned polarizer where the polarization orientation is space variant.

Figure 6:
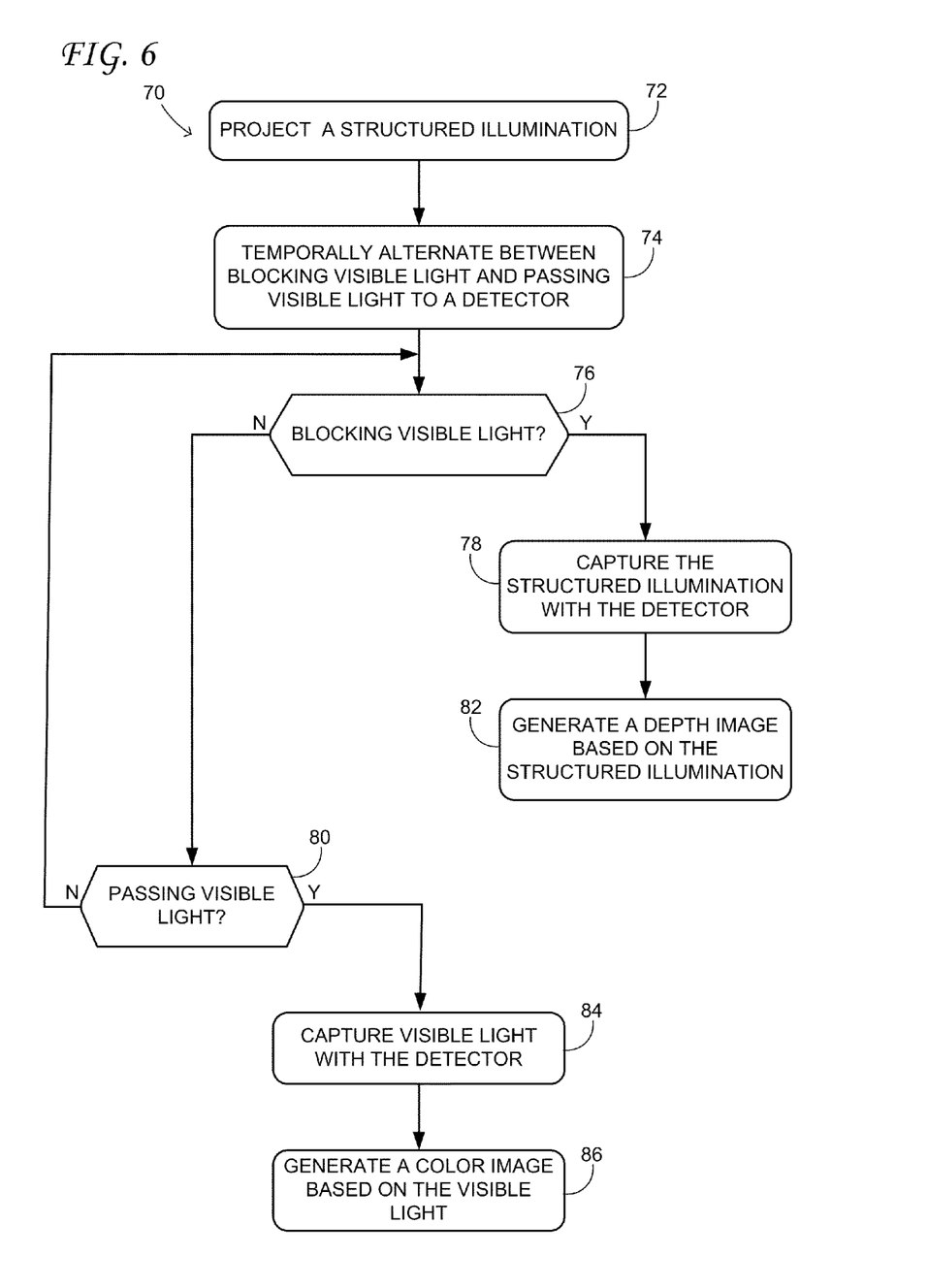
FIG. 6 shows an example method of constructing a color image and a depth image using a shared image sensor.

FIG. 6 shows an example method 70 of constructing a color image and a depth image using a shared image sensor. At 72, method 70 includes projecting a structured illumination onto a scene. The structured illumination may be characterized by a near-infrared wavelength or any other characteristic that permits visible light to be filtered while leaving the structured illumination substantially unfiltered. The structured illumination may be projected from any suitable light source, such as light sources including near-infrared lasers.

At 74, method 70 includes temporally alternating between blocking visible light from the scene to a detector and passing visible light from the scene to the detector. In some embodiments, this may be accomplished using a temporal filter, such as a rotating wheel filter.

At 76, method 70 includes a logic branch. If visible light is blocked, the method moves to 78. If visible light is not blocked, the method moves to 80. At 78, method 70 includes capturing the structured illumination with the detector. The detector may be any suitable detector capable of capturing the structured illumination and visible light.

At 82, method 70 includes generating a depth image based on the structured illumination captured with the detector. The depth image may be constructed at least in part by a depth analyzer configured to assess positional depth values for the pixels based on the relative locations of spaced-apart light features making up the structured illumination. To facilitate this type of image processing, an image sensor may include a pixel array structure such that both monochrome light and RGB light can be detected.

At 80, method 70 includes a logic branch. If visible light is passed, the method moves to 84. If visible light is not passed (e.g., light from the scene is not passing through either a visible light or a near-infrared filtering portion of the filter), the method loops back to 76.

At 84, method 70 includes capturing visible light with the detector. The same detector that is used to capture the structured illumination at 78 is used to capture the visible light at 84.

At 86, method 70 includes generating a color image based on visible light captured with the detector. The color image may be a multi-color image, a black and white image, or a grayscale image.

While described above in the context of filtering between an infrared structured illumination used to form a depth image and visible light used to form a color image, it is to be understood that the filtering mechanisms described herein may be used to filter other types of depth-imaging illuminations from light having one or more different characteristics (e.g., wavelength, polarization, etc.), or vice versa. In general, one or more types of light having a first characteristic may be filtered from a different type of light having a different characteristic as described herein. Nonlimiting examples of light types that may be filterable relative to one another include visible light, infrared light, near-infrared light, ultraviolet light, structured light, and/or modulated light.

As described below with reference to FIG. 7, a variety of different computing systems may be used without departing from the spirit of this disclosure. The operating environment described with reference to FIG. 2 is provided as an example, but is not meant to be limiting in any way. To the contrary, the illustrated operating environment is intended to demonstrate a general concept, which may be applied to a variety of different operating environments without departing from the scope of this disclosure.

The methods and processes described herein may be tied to a variety of different types of computing systems. FIG. 7 schematically shows a computing system 90 that may perform one or more of the color image construction and depth image construction methods described herein. Computing system 90 may take a variety of different forms, including, but not limited to, gaming consoles, personal computing systems, military tracking and/or targeting systems, and character acquisition systems offering green-screen or motion-capture functionality, among others.

Computing system 90 may include a logic subsystem 92, a data-holding subsystem 94 operatively connected to the logic subsystem, a display subsystem 96, and/or a dual-mode imager 98. The computing system may optionally include components not shown in FIG. 7, and/or some components shown in FIG. 7 may be peripheral components that are not integrated into the computing system.

Logic subsystem 92 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alterly, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 94 may include one or more physical devices configured to hold data and/or instructions executable by the logic subsystem to implement the herein described methods and processes. When such methods and processes are implemented, the state of data-holding subsystem 94 may be transformed (e.g., to hold different data). Data-holding subsystem 94 may include removable media and/or built-in devices. Data-holding subsystem 94 may include optical memory devices, semiconductor memory devices (e.g., RAM, EEPROM, flash, etc.), and/or magnetic memory devices, among others. Data-holding subsystem 94 may include devices with one or more of the following characteristics: volatile, nonvolatile, dynamic, static, read/write, read-only, random access, sequential access, location addressable, file addressable, and content addressable. In some embodiments, logic subsystem 92 and data-holding subsystem 94 may be integrated into one or more common devices, such as an application specific integrated circuit or a system on a chip.

Figure 7:
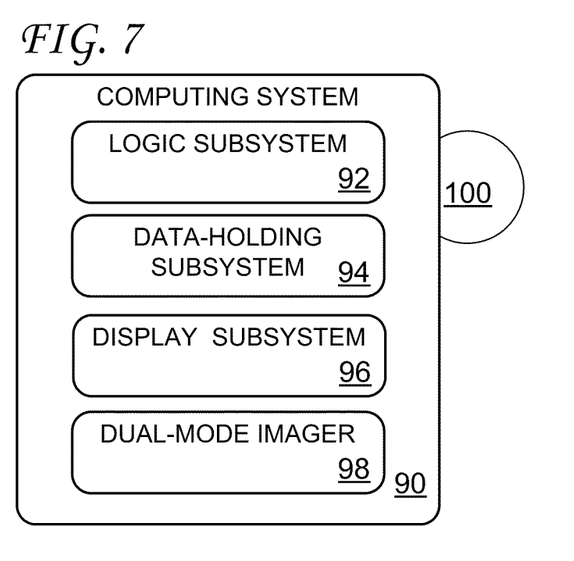
FIG. 7 schematically shows an example computing system capable of constructing a color image and a depth image using a shared image sensor.

FIG. 7 also shows an aspect of the data-holding subsystem in the form of computer-readable removable media 100, which may be used to store and/or transfer data and/or instructions executable to implement the herein described methods and processes.

Display subsystem 96 may be used to present a visual representation of data held by data-holding subsystem 94. As the herein described methods and processes change the data held by the data-holding subsystem, and thus transform the state of the data-holding subsystem, the state of display subsystem 96 may likewise be transformed to visually represent changes in the underlying data (e.g., display subsystem may display a constructed color image, a visual representation of a constructed depth image, and/or a virtual model based off of a constructed depth image). Display subsystem 96 may include one or more display devices utilizing virtually any type of technology. Such display devices may be combined with logic subsystem 92 and/or data-holding subsystem 94 in a shared enclosure, or such display devices may be peripheral display devices.

Computing system 90 further includes a dual-mode imager 98 configured to obtain both depth images and color images of one or more targets and/or scenes. A depth image may be constructed using structured light analysis. In such an analysis, patterned light (i.e., light displayed as a known pattern such as a grid pattern or a stripe pattern) may be projected onto the scene. On the surfaces of the scene, the pattern may become deformed, and this deformation of the pattern may be studied to determine a physical distance from the dual-mode imager to a particular location in the scene. The dual-mode imager may include a temporal or spatial filter to selectively block visible light, thus facilitating the capturing of both depth images and color images with the same dual-mode imager.

It is to be understood that at least some depth analysis operations may be executed by a logic machine of one or more dual-mode imagers. A dual-mode imager may include one or more onboard processing units configured to perform one or more depth analysis functions. A dual-mode imager may include firmware to facilitate updating such onboard processing logic.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A dual-mode imager for imaging a scene illuminated by visible light, the dual-mode imager comprising:
    a light source configured to project onto the scene a structured illumination including infrared radiation from which a full spectrum of visible light is filterable;
    a detector configured to capture both the structured illumination and visible light from the scene; and
    a filter, between the scene and the detector, to selectively block the full spectrum of visible light from one or more portions of the detector while passing the structured illumination including the infrared radiation to the one or more portions of the detector.

2. The dual-mode imager of claim 1, where the filter includes a temporal filter configured to temporally alternate between blocking the full spectrum of visible light from the detector and passing visible light to the detector.

3. The dual-mode imager of claim 2, where the filter includes a rotating wheel filter including one or more portions configured to block the full spectrum of visible light and one or more portions configured to pass visible light.

4. The dual-mode imager of claim 3, where the rotating wheel filter is configured to block the full spectrum of visible light for approximately half of a rotation and pass visible light for approximately half of the rotation.

5. The dual-mode imager of claim 2, further comprising a controller to coordinate the temporal filter and the detector such that images captured by the detector while the temporal filter is blocking the full spectrum of visible light from the detector are sorted to construct a depth image, and such that images captured by the detector while the temporal filter is passing visible light to the detector are sorted to construct a color image.

6. The dual-mode imager of claim 5, where the temporal filter includes a polarizer and a photoelastic modulator to temporally alternate between blocking the full spectrum of visible light from the detector and passing visible light to the detector without moving parts.

7. The dual-mode imager of claim 1, where the filter includes a spatial filter configured to block the full spectrum of visible light from some portions of the detector while allowing visible light to pass to other portions of the detector.

8. The dual-mode imager of claim 7, where the detector includes a plurality of spatially alternating pixel groups, and where the spatial filter is configured to block the full spectrum of visible light from every other pixel group of the plurality of spatially alternating pixel groups.

9. The dual-mode imager of claim 8, where the plurality of spatially alternating pixel groups are spatially alternating rows of pixels.

10. The dual-mode imager of claim 7, where the spatial filter includes a polarizer, a wavelength sensitive color rotator, and a patterned polarizer having a polarization orientation that is space variant.

11. The dual-mode imager of claim 1, where the detector includes a complementary metal-oxide-semiconductor.

12. The dual-mode imager of claim 1, where the light source includes a laser having a near-infrared lasing wavelength.

13. The dual-mode imager of claim 12, where the light source includes a disperser configured to disperse a collimated beam from the laser among a range of projection angles to illuminate the scene with a plurality of spaced-apart light features having a near-infrared wavelength.

14. The dual-mode imager of claim 1, further comprising a depth analyzer configured to construct a depth image based on one or more images of the structured illumination captured by the detector.

15. A dual-mode imager for imaging a scene, the dual-mode imager comprising:
    a near-infrared light source configured to project onto the scene a depth-imaging illumination having a near-infrared wavelength;
    a complementary metal-oxide-semiconductor configured to capture near-infrared light and visible light from the scene; and
    a rotating wheel filter optically intermediate the scene and the complementary metal-oxide-semiconductor, the rotating wheel filter including a first portion configured to block a full spectrum of visible light and pass near-infrared light and a second portion configured to pass visible light.

16. The dual-mode imager of claim 15, where the complementary metal-oxide-semiconductor captures two images during each rotation of the rotating wheel filter.

17. The dual-mode imager of claim 15, where the first portion is optically intermediate the scene and the complementary metal-oxide-semiconductor every other time the complementary metal-oxide-semiconductor captures an image.

18. The dual-mode imager of claim 15, further comprising a depth analyzer configured to construct a depth image based on one or more images captured by the complementary metal-oxide-semiconductor while the first portion is blocking the full spectrum of visible light from the complementary metal-oxide-semiconductor.

19. The dual-mode imager of claim 15, where the second portion is configured to block near-infrared light.

20. A method of constructing a color image and a depth image, the method comprising:
    projecting onto a scene a structured illumination having a near-infrared wavelength;
    temporally alternating between blocking a full spectrum of visible light from the scene to a detector and passing visible light from the scene to the detector;
    while blocking the full spectrum of visible light from the scene, capturing the structured illumination with the detector;
    while passing visible light from the scene, capturing visible light with the detector;
    generating the depth image based on the structured illumination captured with the detector; and
    generating the color image based on visible light captured with the detector.

* * * * *